C. W. MICHAEL.
CULTIVATOR.
APPLICATION FILED FEB. 26, 1912.
1,100,387.
Patented June 16, 1914.
3 SHEETS—SHEET 1.
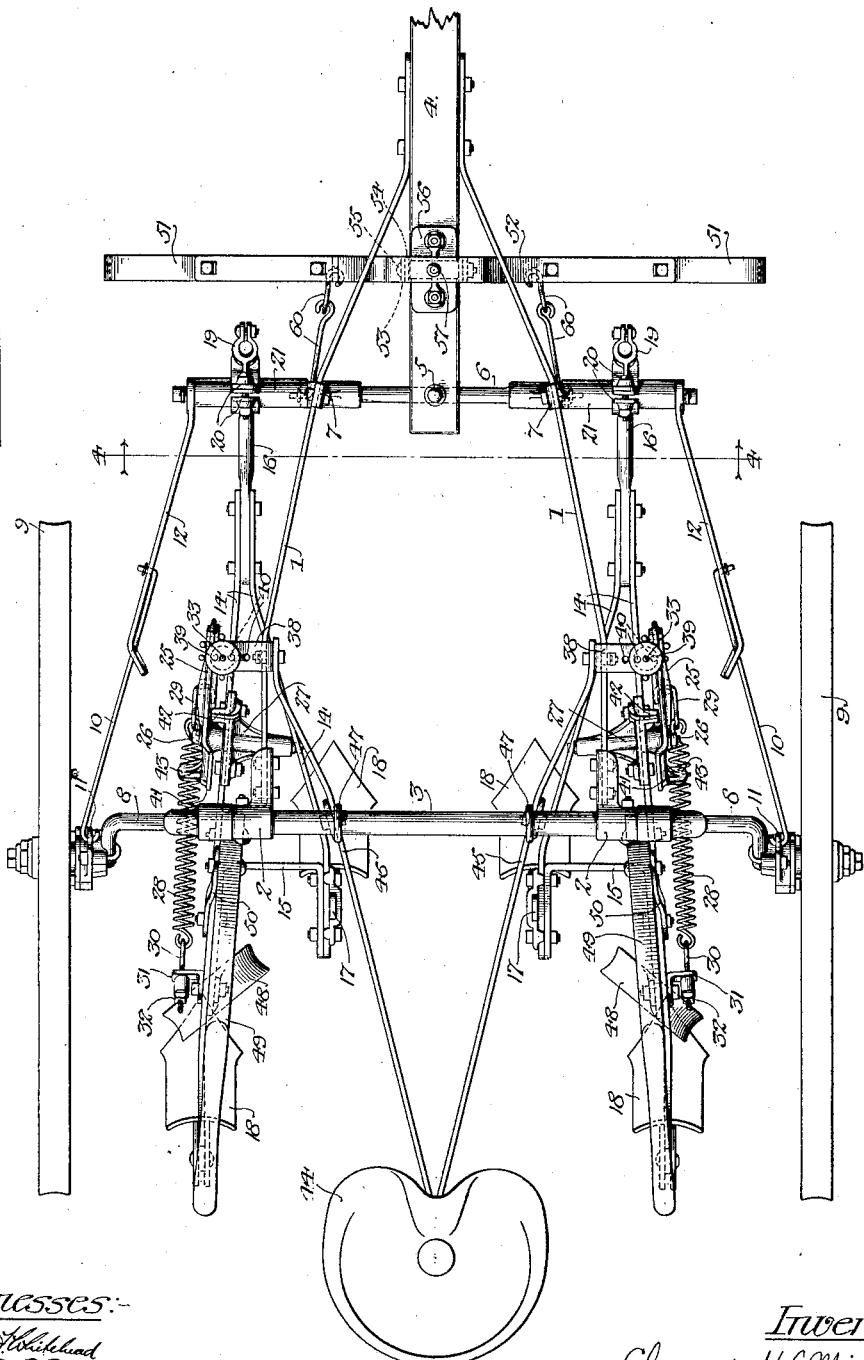

C. W. MICHAEL.
CULTIVATOR.
APPLICATION FILED FEB. 26, 1912.
1,100,387.
Patented June 16, 1914.
3 SHEETS—SHEET 2.
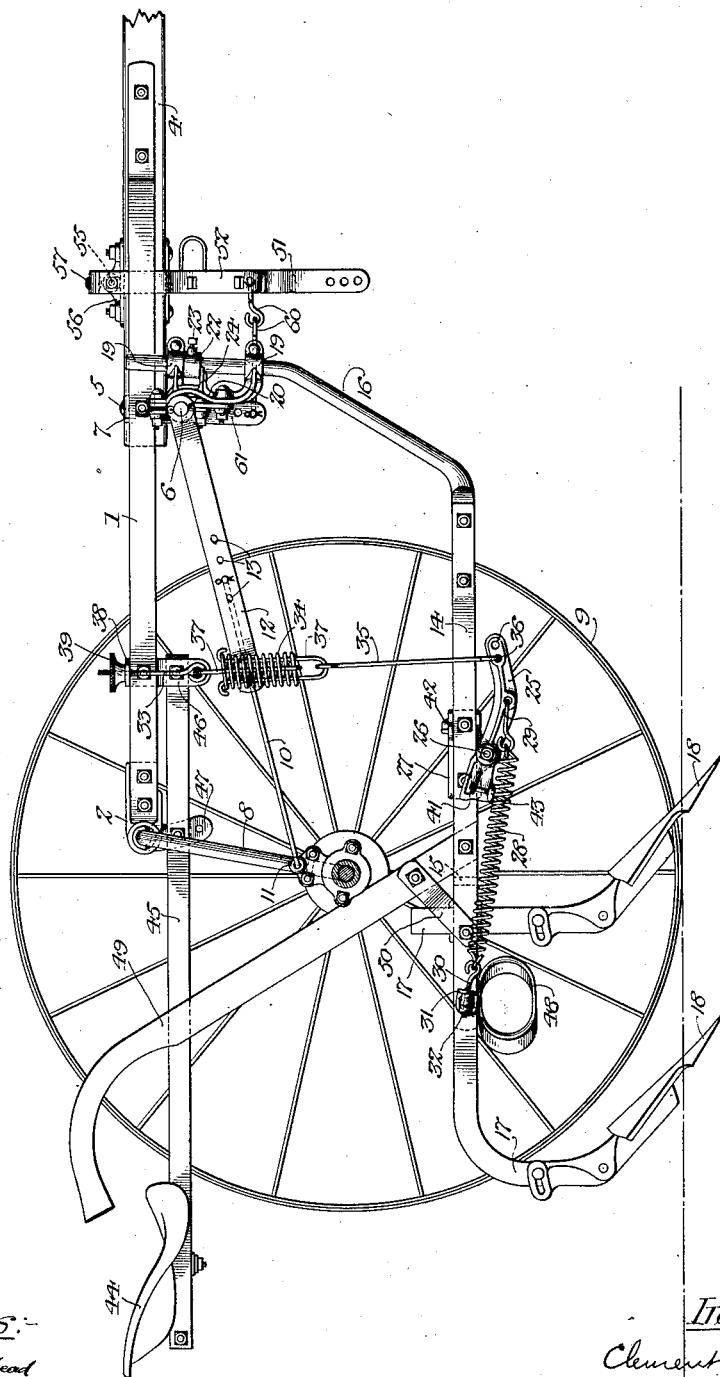

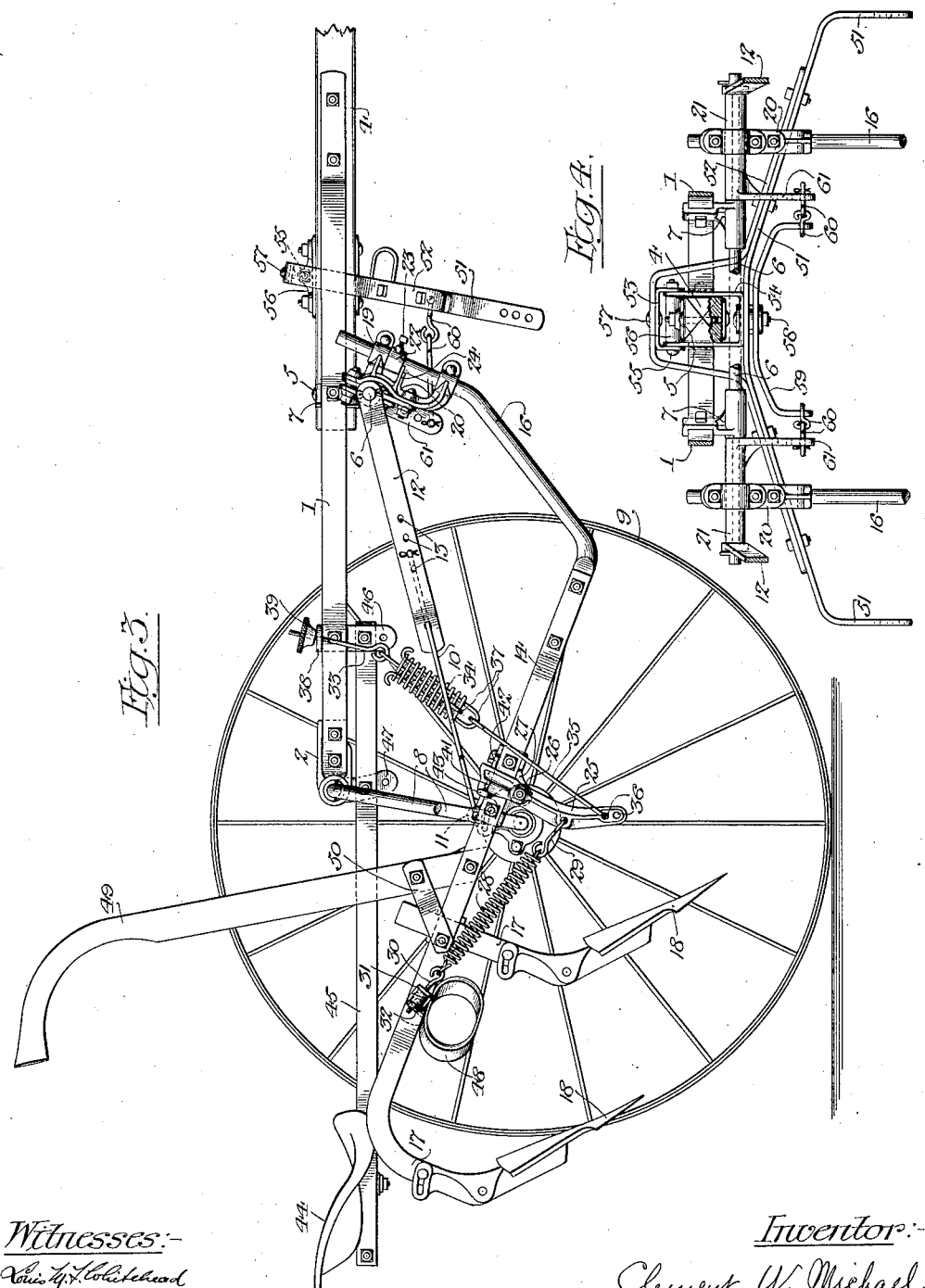

UNITED STATES PATENT OFFICE.

CLEMENT W. MICHAEL, OF RACINE, WISCONSIN, ASSIGNOR TO J. I. CASE PLOW WORKS, OF RACINE, WISCONSIN, A CORPORATION.

CULTIVATOR.

1,100,387. Specification of Letters Patent. Patented June 16, 1914.

Application filed February 26, 1912. Serial No. 679,862.

*To all whom it may concern:*

Be it known that I, CLEMENT W. MICHAEL, a citizen of the United States, and a resident of Racine, county of Racine, and State of Wisconsin, have invented certain new and useful Improvements in Cultivators, of which the following is a full, clear, and exact description.

The invention relates to wheeled cultivators and seeks to provide an improved lift mechanism by which the cultivator beams or gangs may be readily and quickly shifted to and from working position.

The invention also seeks to provide an improved arrangement of lift mechanism in which the lifting is effected in the large part through the medium of a spring which also acts to balance or yieldingly support the cultivator beam or gang in working position.

A further object of the invention is to provide an improved lift mechanism which obviates the use of shift levers and which is arranged below the frame so that the upper portions of the cultivator are unobstructed.

Another object of the invention is to provide an improved draft hitch which will aid in holding the cultivator beams or gangs in working position, which will properly throw the draft upon a single gang when the other gang is raised, and which will not interfere with the raising and lowering movement of the beams or gangs.

The invention consists in the features of improvement hereinafter set forth, illustrated in the preferred form in the accompanying drawing and more particularly pointed out in the appended claims.

In the drawings, Figure 1 is a plan view of the improved cultivator. Fig. 2 is a side view thereof with the near wheel removed and the beams or gangs in working position. Fig. 3 is a view similar to Fig. 2 with the beams or gangs in raised position. Fig. 4 is a cross section on the line 4—4 of Figs. 1 and 2, illustrating the details of the draft connections.

The frame of the cultivator comprises side bars 1 which are connected at their rear ends by brackets 2 to the ends of the tubular, central section 3 of the arched axle. The forward converging ends of the side frame bars 1 are secured to the tongue 4. The rear end of the tongue is connected by a bolt 5 to a short cross shaft 6 and the latter extends through brackets 7 which are connected to the side frame bars 1. The wheel sections 8 of the arched axle are connected to and depend from the tubular section 3 and the supporting wheels 9 are journaled upon their lower ends. Inclined braces connect the lower ends of the depending wheel sections 8 of the arched axle with the forward portion of the frame. In the construction shown, each of these braces comprises a rod 10 which engages an I-piece 11 on the lower end of the wheel section 8 and which extends through an opening in the end of a strap 12, the opposite end of which is secured to the end of the short cross shaft 6. The forward end of the rod 8 is arranged to adjustably engage any one of a series of holes 13 in the strap 12.

Each of the gangs shown comprises a pair of beam bars 14 connected at their rear ends by a cross-piece 15 and at their forward ends to the lower end of a standard 16. Standards 17 depending from the beam bars carry suitable shovels 18. The standards 16 extend upwardly and the upper vertical portions thereof are journaled in suitable bearings 19 of couplings 20 to permit the lateral swinging movement of the beams. The couplings are mounted upon sleeves 21 (see Fig. 4) which, in turn, are rotatably mounted upon the ends of the short cross shaft 6 to permit the vertical movement of the cultivator beams or gangs to and from working position. As usual, the couplings are adjustable laterally upon the sleeves 21 for cultivating rows of different widths. Collars 22 adjustably fixed to the upper ends of the standards by set screws 23 are arranged between the upper bearings 19 of the couplings 20 and lugs 24 thereon and thus connect the standards to the couplings.

A lift mechanism is interposed between the frame and each cultivator beam and comprises a swinging lever arm mounted on one of said parts and suitably connected to the other of said parts, together with a lift spring connected to the lever arm and arranged, in the working position of the beam, to act upon a line extending across and closely adjacent the pivot or fulcrum of the lever arm and arranged to coöperate with a stop device, which is preferably formed on the lever arm to yieldingly support the beam in working position.

In the preferred embodiment of the invention, a lever arm 25 is pivotally mounted on the cultivator beam adjacent its forward end. In the form shown, a pivot bolt 26 extends through the arm and through a bracket 27 which is secured to the outer beam bar 14. In the lowered position of the cultivator beam, the lever arm extends forwardly and substantially horizontally from its pivot, (see Fig. 2) and in the raised position the arm extends downwardly from its pivot (see Fig. 3). A heavy coiled lifting spring 28 is connected at its forward end by means of a link 29 to the lever arm 27 at a point between the pivot and the lower forward end of the arm. The rear end of the spring is connected to a bolt 30 which extends through a clip on the rear portion of the cultivator beam and a nut 31 on the bolt secures the latter to the clip and serves as a means for adjusting the tension of the lift spring.

Each of the cultivator beams or gangs are provided with a lever arm and a lift spring, and link connections extend downwardly from the frame to the outer forward ends of the lever arms. These link connections are preferably adjustable and, preferably also, are rendered yielding by means of cushion springs interposed therein. In the form shown, each link connection comprises a bolt 33, a cushion spring 34 and a link 35. The lower hooked end of the link 35 adjustably engages either one of a plurality of holes 36 in the end of the arm 25. A pair of U-bolts 37 extend through the coiled cushion spring 34 and are hooked over the opposite end thereof. These U-bolts engage the hooked ends of the link 35 and the bolt 33. The bolts 33 extend through the horizontal portions 38 of a pair of brackets which are secured to the side frame bars 1 of the machine in front of the wheel axle and project laterally and outwardly therefrom. A pair of adjusting spool nuts 39 are threaded upon the upper ends of the bolts 33 into engagement with the portions 38 to secure the link connections to the frame. Preferably the parts 38 are provided with a number of holes 40 to receive the bolts 33 to properly position the link connections between the frame and the shovel beams or gangs when the latter are adjusted laterally to cultivate rows of different widths.

The lifting spring 28 and the connections between the frame and the lever arm 25 are connected to the main portion of the lever arm on one side of its pivot. The arm is also provided with a projecting tail piece 41 on the opposite side of its pivot which, in the raised position of the beam, is arranged to engage a laterally projecting stop lug 42 on the bracket 27 to limit the upward movement of the beam. The tail portion 41 of the lever arm 25 is also provided with an outwardly and laterally projecting stop lug 43 which, in the lowered position of the beam, is arranged to engage the lift spring 28 to thereby yieldingly limit the movements of the spring and lever arm and yieldingly support the beam in working position.

The operator's seat 44 is secured to the rear ends of a pair of bars 45. The forward, divergent ends of the seat bars are secured to depending portions 46 of the brackets 38. The seat bars are also connected adjacent their forward ends by clips 47 to the upper, central section of the arched axle. The cultivator beams or gangs are guided and the raising and lowering thereof is controlled by the operator through the medium of foot stirrups, handles or the like. Both are preferably provided so that either or both may be employed, as convenient. In the form shown, the cultivator beams or gangs are provided with foot stirrups 48 secured to and depending therefrom and with upwardly and rearwardly projecting handle bars 49 connected at their lower ends to the beams. As shown, inclined brace bars 50 extend between the beams and the lower portions of the handle bars.

The draft animals are connected to the outer ends of an evener which, in the form shown, comprises lower and upper bars 51 and 52 having parallel portions bolted together. The lower bar 51 of the evener extends beneath the pole 4, while the upper bar is provided with a central arched portion which extends over the pole and between the latter and the forward ends of the side frame bars 1. A rectangular evener support extends around the pole 4 and within the central arched portion of the bar 52 and comprises upper and lower U-shaped pieces 53 and 54, the ends of which overlap and engage a horizontal pivot bolt 55. This pivot bolt extends through a bracket 56 which is bolted to the upper face of the pole. The upper central portion of the evener bar 52 is pivotally connected to the part 53 of the evener support by a bolt or rivet 57, while the lower evener bar is pivotally connected to the lower portion 54 of the evener support by a bolt 58 which is axially in line with the bolt or rivet 57. An auxiliary independently movable evener bar 59 is also pivotally connected, at its center, to the main evener and to the evener support by the bolt 58. The outer depending ends of the auxiliary evener 59 are connected by jointed links 60 to a pair of arms 61 on the inner ends of the sleeves 21 on the cross shaft 6. Preferably, two or more holes are provided in the arms 61 so that the connections between the arms and the auxiliary evener may be adjusted.

It should be noted that both eveners have a bodily movement in fore and aft direction with the evener support 53—54 and about the horizontal pivot 55. Each evener has a horizontal swinging movement independently of the evener support upon the pivots 57 and 58. The couplings 20 are clamped to the sleeves 21 which carry the arms 61 so that the draft of the team is applied to the couplings and assists in holding the cultivator beams in working position, but the fore and aft swing of the evener about the horizontal pivot 55 allows the cultivator beams or gangs to be readily lifted. The independent horizontal swinging of the main and auxiliary eveners properly distributes the draft of the team and also properly applies the draft to one of the cultivator beams or gangs when the other is raised.

As the gangs are lowered to working position, the stop lugs 43 upon the lever arms 25, as stated, engage the springs 28 to yieldingly limit the movements of the springs and lever arms and the downward movement of the beams or gangs. In this position, the arrangement is such that each lift spring acts upon a line which extends across the pivot or fulcrum 26 of its lever arm and closely adjacent the pivot, so that the spring has little tendency to raise the beam. When the gangs are lifted slightly by the operator, the lever arms swing downwardly and the springs are thrown away from the fulcrums thereof, so that the full force of the springs is exerted to quickly lift the beams into the position shown in Fig. 3. The upward movement of the beams is limited by the engagement of the tail portions 41 of the lever arms with the stops 42. As stated, the springs 28 in working position are near a dead center position, so that they have little tendency to raise the beams, but any such tendency is overcome by the draft of the team which is applied through the main and auxiliary equalizers to aid in holding the beams in working position. In practice, it is found that this draft of the team with the construction shown does not become effective until the beams are nearly in working position. Furthermore, inasmuch as both equalizers are free to swing rearwardly about the horizontal pivot bolt 55, when the gangs are raised, as shown in Fig. 3, the draft of the team does not interfere with the lifting movement of the beams.

The springs 28 not only act as lift springs, but also act as balancing springs to yieldingly support the gangs in working position. This is effected by means of the stop devices 43 which, as stated, are preferably carried upon the tail portions of the lever arms, and which engage the springs when the beams are in working position to hold the spring slightly away from a dead center position, as shown in Fig. 1. If the beams are depressed below working position, the forward portions of the arms are upheld by the link connections between them and the frame, but the tail portions of the levers are depressed so that the springs 28 are deflected and the tension thereof increased. The reaction of the springs then tends to lift the beams back to the normal working position. Furthermore, by means of the spool nuts 39 on the link connections between the frame and the arms 25, the link connections may be adjusted to turn the arms 25 about the pivots 26 and thus adjust the stop lugs 43 relatively to the springs. In this way, the working depth of the cultivator beams may be regulated or the parts of the lift mechanism properly adjusted to accommodate cultivator gangs of different weight. The leverage of the stop lug 43 upon the spring is quite short, so that the operator may readily guide the gangs, when working in the soil, through a comparatively wide range of movement in vertical direction. The balancing action of the springs 28 is aided by the cushion springs 34. These springs also have been found in practice to aid the raising and lowering movements of the gangs and serve to cushion the movement of the parts in the extreme raised and lowered positions thereof.

It should be noted that, in the preferred form of the invention set forth, the lift mechanism for each gang is independent of the other and that the lift mechanism is located below the frame so that the upper portion of the frame is unobstructed. The operator can readily guide the cultivator means or gangs and control the raising and lowering thereof, the raising being effected, in great part, by the lift springs. In practice it is found that the yielding connections between the frame and the lever arms 25 facilitates the depression of the cultivator beams against the tension of the lift springs. The arrangement of the lift mechanism is such that gangs are raised to a high position above the ground and there is no necessity of employing hang-up hooks for holding the gangs in elevated position in driving to and from the field.

It is obvious that numerous changes may be made in the details set forth without departure from the essentials of the invention as defined in the claims.

I claim as my invention:—

1. In a cultivator, the combination with the wheel supported frame and a cultivator beam hung thereon, of a lever arm mounted on said beam, a link connection between said frame and said arm, a spring for lifting said beam and for balancing the same in working position, connected at its opposite ends to said beam and to said arm, said spring being arranged to act on a line extending across and adjacent the pivot of said lever arm when the beam is in working position, and means for deflecting said spring when the beam is depressed below working position, substantially as described.

2. In a cultivator, the combination with the wheel supported frame and a cultivator beam hung thereon, of a lever arm mounted on said beam, a link connection between said frame and said arm, a spring for lifting said beam and for balancing the same in working position, connected at its opposite ends to said beam and to said arm, said spring being arranged to act on a line extending across and adjacent the pivot of said lever arm when the beam is in working position, and a stop device arranged to limit the movement of said spring and to deflect the same when the beam is depressed below working position, substantially as described.

3. In a cultivator, the combination with the wheel supported frame and a cultivator beam hung thereon, of a lever arm pivotally mounted on said beam, a link connection extending between said frame and said lever arm, and a combined lifting and balancing spring connected to said beam and to said arm on one side of the pivot thereof, said arm having a stop lug on the opposite side of its pivot arranged to coöperate with said spring to yieldingly support said beam in working position.

4. In a cultivator, the combination with the wheel supported frame and a cultivator beam hung thereon, of a lever arm pivotally mounted on said beam, a link connection extending downwardly from said frame to said lever arm, and a lift spring connected to said arm and to said beam and arranged to act upon a line extending across and adjacent the pivot of said lever when the beam is in working position, and a stop on said beam for limiting the movement of said arm when the beam is raised, substantially as described.

5. In a cultivator, the combination with the wheel supported frame and a cultivator beam hung thereon, of a lever arm pivotally mounted on said beam, a link connection extending downwardly from said frame to said lever arm, and a lift spring connected to said arm and to said beam and arranged to act upon a line extending across and adjacent the pivot of said lever when the beam is in working position, and a stop on said beam for limiting the movement of said arm when the beam is raised, and said arm having a part coöperating with said spring to yieldingly support the beam in working position, substantially as described.

6. In a cultivator, the combination with a wheel supported frame and cultivator beam hung thereon, of a shift lever pivoted on said beam, a lift spring connected at its ends to said lever and to said beam, and a yielding link connected to said frame and whereon said shift lever is fulcrumed, substantially as described.

7. In a cultivator, the combination with the wheel-supported frame and cultivator beam hung thereon, of a lever arm pivoted on said beam, a link connection extending downwardly from said frame to said arm, a cushion spring in said link connection, a lift spring connected to said beam and said arm, and means for limiting the movements of said arm and said lift spring, substantially as described.

8. In a cultivator, the combination with the wheel-supported frame and cultivator beam hung thereon, of a lever arm pivoted on said beam, a link connection extending downwardly from said frame to said arm, a cushion spring in said link connection, and a lift spring connected to said beam and said arm, the latter having a stop lug coöperating with said spring to yieldingly support said beam in working position, substantially as described.

9. In a cultivator, the combination with the wheel-supported frame and cultivator beam hung thereon, of a lever arm pivoted on said beam, a link connection extending downwardly from said frame to said arm, a cushion spring in said link connection, a lift spring connected to said beam and said arm, the latter having a stop lug coöperating with said spring to yieldingly support the beam in working position, and means for adjusting said link connection and said arm, substantially as described.

10. In a cultivator, the combination with the wheel-supported frame and cultivator beam hung thereon, of a lever arm mounted on said beam, an adjustable link connection between said frame and said arm, and a combined lifting and balancing spring connected to said beam and to said arm, said arm having a stop lug coöperating with said spring to yieldingly support said beam in working position, substantially as described.

11. In a cultivator, the combination with the wheel-supported frame and cultivator beam hung thereon, of a lever arm mounted on said beam, an adjustable link connection between said frame and said arm, and a combined lifting and balancing spring connected to said beam and to said arm on one side of its pivot, said arm having a stop lug on the opposite side of its pivot arranged to engage and coöperate with said spring to yieldingly support said beam in working position, substantially as described.

12. In a cultivator, the combination with the wheel-supported frame and cultivator beam hung thereon, of a lift mechanism interposed between said frame and said beam and comprising a lever arm mounted on one of said parts, and connected to other of said parts, and a combined lifting and balancing spring connected to said arm and to the part whereon said arm is mounted and arranged to act upon a line extending across and adjacent the pivot of said lever arm, the latter having a stop lug arranged to coöperate with said spring to yieldingly support said beam in working position, substantially as described.

13. In a cultivator, the combination with the wheel-supported frame and cultivator beam hung thereon, of a lift mechanism interposed between said frame and said beam and comprising a lever arm pivoted on one of said parts, an adjustable link connection between said arm and the other of said parts, and a combined lifting and balancing spring connected to said arm on one side of its pivot, said arm having a stop lug on the opposite side of its pivot arranged to engage and coöperate with said spring to yieldingly hold said beam in working position, substantially as described.

14. In a cultivator the combination with the wheel-supported frame and cultivator beam hung thereon, of a lever arm pivoted on said beam and extending downwardly and forwardly therefrom, a link connection extending downwardly from said frame to the end of said arm, a lift spring connected at its rear to said beam, and at its forward end to said arm, and means for limiting the movements of said arm and said spring, substantially as described.

15. In a cultivator the combination with the wheel-supported frame and cultivator beam hung thereon, of a lever arm pivoted on said beam and extending downwardly and forwardly therefrom, a link connection extending downwardly from said frame to the end of said arm, a lift spring connected at its rear to said beam, and at its forward end to said arm, said arm having a stop lug coöperating with said spring to hold said beam in working position, and a stop on said beam for limiting the movement of said arm when the beam is raised, substantially as described.

16. In a cultivator the combination with the wheel-supported frame and cultivator beam hung thereon, of a lever arm pivoted on said beam and extending downwardly and forwardly therefrom, a link connection extending downwardly from said frame to the end of said arm, a lift spring connected at its rear to said beam, and at its forward end to said arm, and a cushion spring interposed in said link connection, substantially as described.

17. In a cultivator, the combination with the wheel-supported frame and cultivator beam hung thereon, of a lever arm pivoted on said beam and extending downwardly and forwardly therefrom, a link connection extending downwardly from said frame to the end of said arm, said arm having a stop lug coöperating with said spring to yieldingly hold said beam in working position, and means for adjusting said link, substantially as described.

18. In a cultivator, the combination with the wheel-supported frame and cultivator beam hung thereon, of a lever arm pivoted on said beam and extending downwardly and forwardly therefrom, a link connection extending downwardly from said frame to the end of said arm, said arm having a stop lug arranged to engage said spring and hold said beam in working position, a stop on said beam for limiting the movement of said arm when the beam is raised, a cushion spring interposed in said link connection, and means for adjusting said link connection, substantially as described.

19. In a cultivator, the combination with the frame and supporting wheels, of a pair of cultivator beams having upwardly projecting standards at their forward ends, couplings wherein said standards are journaled to permit the horizontal movement of said beams, said couplings being mounted at the forward part of said frame to swing upon a horizontal axis to permit the vertical movement of said beams, an evener support mounted on the frame and movable in fore and aft direction, main and auxiliary eveners vertically swiveled to said evener support and connections between the ends of said auxiliary evener and said couplings, substantially as described.

20. In a cultivator, the combination with the wheel supported frame and cultivator beams hung thereon, of an evener support mounted at the forward part of said frame to move in fore and aft direction, main and auxiliary eveners centrally pivoted to said evener support to swing horizontally, said main evener being adapted to engage the draft devices, and connections between the ends of said auxiliary evener and said cultivator beams, whereby the draft tends to hold the beams in working position.

21. In a cultivator, the combination with the frame, comprising an arched wheel axle, side frame bars and a tongue, of cultivator beams having upwardly projecting standards at their forward ends, a cross shaft connected to the forward part of the frame, sleeves on said cross shaft having arms thereon, couplings mounted on said sleeves, the upper ends of said standards being journaled in said couplings, a rectangular evener support surrounding and horizontally pivoted to said tongue, main and supplemental evener bars vertically pivoted to said evener support, and connections between the ends of said supplemental evener and the rock arms on said sleeves, substantially as described.

22. In a cultivator, the combination with a wheel supported frame and a cultivator beam hung thereon, of a lever arm mounted on said beam, a connection between said arm and said frame, a combined lifting and balancing spring connected to said arm and to said beam, and an adjustable stop device for limiting the movement of said arm and said spring, and coöperating therewith to hold said spring away from the dead center position to thereby yieldingly support said beam in working position, substantially as described.

23. In a cultivator, the combination with a wheel supported frame, an operator's seat thereon, and cultivator beams hung on said frame, of lever arms mounted on said beams, connections between said arms and said frame, combined lifting and balancing springs connected to said beams and to said arms, stop devices for limiting the movement of said arms and said springs and coöperating therewith to yieldingly support said beams in working position, and foot stirrups on said beams for guiding the same and controlling the raising and lowering movement thereof, substantially as described.

24. In a cultivator the combination with a wheel supported frame, an operator's seat thereon, and cultivator beams hung on said frame, of lever arms mounted on said beams, connections between said arms and said frame, combined lifting and balancing springs connected to said beams and to said arms, stop devices for limiting the movement of said arms and said springs and coöperating therewith to yieldingly support said beams in working position, and draft devices connected to said cultivator beams for holding the same in the ground against the tension of said springs, substantially as described.

25. The combination with a wheel supported frame and a cultivator beam hung thereon, of a lever arm pivotally mounted on one of said parts, connections between said arm and the other of said parts, a combined lifting and balancing spring connected to said lever arm, a stop device for limiting the movement of said arm and said spring and coöperating therewith to hold said spring away from dead center position to thereby yieldingly support said beam in working position, and means for adjusting said stop device.

26. The combination with a wheel supported frame, a rider's seat thereon and cultivator beams hung on said frame, of a lift mechanism interposed between said frame and each of said beams comprising a lever arm pivotally mounted on one of said parts, a link connecting said lever arm to the other of said parts, a combined lifting and balancing spring connected to said lever arm, a stop lug for limiting the movement of said arm and spring and coöperating therewith to hold said spring away from the dead center position to thereby yieldingly support the beam in working position, foot stirrups mounted on said beams for guiding the same and controlling the raising and lowering movement thereof, and draft devices mounted on the frame and connected to said cultivator beams for holding the latter in working position against the tension of said springs, substantially as described.

CLEMENT W. MICHAEL.

Witnesses:
HARRY L. CLAPP,
KATHARINE GERLACH.

Copies of this patent may be obtained for five cents each, by addressing the "Commissioner of Patents, Washington, D. C."